United States Patent
Borenstein et al.

(10) Patent No.: US 10,701,999 B1
(45) Date of Patent: Jul. 7, 2020

(54) ACCURATE SIZE SELECTION

(71) Applicant: A9.com, Inc., Palo Alto, CA (US)

(72) Inventors: Eran Borenstein, Los Gatos, CA (US); Chetan Pitambar Bhole, San Mateo, CA (US); Erick Cantu-Paz, San Jose, CA (US); Arnab Sanat Kumar Dhua, Mountain View, CA (US); Anish Ramdas Nair, Fremont, CA (US)

(73) Assignee: A9.COM, INC., Palo Alto, CA (US)

( * ) Notice: Subject to any disclaimer, the term of this patent is extended or adjusted under 35 U.S.C. 154(b) by 14 days.

(21) Appl. No.: 14/973,436

(22) Filed: Dec. 17, 2015

(51) Int. Cl.
*A41H 1/02* (2006.01)
*G06T 7/00* (2017.01)
*G06K 9/00* (2006.01)

(52) U.S. Cl.
CPC ........... *A41H 1/02* (2013.01); *G06K 9/00369* (2013.01); *G06T 7/0087* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 7,051,452 B2 * | 5/2006 | Brooks | A43D 1/025 33/227 |
| 8,908,928 B1 * | 12/2014 | Hansen | G06K 9/00362 382/111 |
| 9,875,546 B1 | 1/2018 | Bhole et al. | |
| 2006/0293151 A1 | 12/2006 | Rast | |
| 2008/0118886 A1 | 5/2008 | Liang et al. | |
| 2011/0123122 A1 | 5/2011 | Agrawal et al. | |
| 2012/0313955 A1 | 12/2012 | Choukroun | |
| 2014/0035913 A1 | 2/2014 | Higgins et al. | |
| 2015/0359461 A1 * | 12/2015 | Alfaro | A43D 1/025 600/476 |
| 2016/0063613 A1 | 3/2016 | Zhao et al. | |
| 2016/0286906 A1 * | 10/2016 | Malal | G01C 11/02 |
| 2017/0132486 A1 | 5/2017 | Boncyk et al. | |
| 2017/0160813 A1 | 6/2017 | Divakaran et al. | |

OTHER PUBLICATIONS

Non-Final Office Action issued in co-related U.S. Appl. No. 15/083,950 dated Jun. 15, 2017.
Notice of Allowance issued in co-related U.S. Appl. No. 15/083,950 dated Oct. 2, 2017.

* cited by examiner

*Primary Examiner* — Vikkram Bali
(74) *Attorney, Agent, or Firm* — Hogan Lovells US LLP

(57) ABSTRACT

Images can be used to determine the size of an article of clothing matching the physical characteristics of a user. An image can include an article of clothing known to fit well or a representation of a body part, which can comprise the body part itself. Images can also include a reference item. Various techniques are used to determine one or more perspective distortions in the image based on analysis of the reference item and information known about the reference item. The one or more perspective distortions can be accounted for to determine physical characteristics of the article of clothing or the body part associated with the article of clothing. The physical characteristics can be used to determine the size of an article of clothing matching, or corresponding to, the physical characteristics.

17 Claims, 13 Drawing Sheets

ACCURATE SIZE SELECTION

BACKGROUND

Multiple standards exist for sizing articles of clothing and other wearable items, such as eyeglasses and jewelry. Various manufacturers and designers size their items according to any one of these standards, and occasionally develop new standards. It follows that a large shirt from one brand may be bigger than a large shirt from a different brand. Likewise, one brand's loose fit pants may be of a different cut, and consequently a different fit, than another brand's loose fit pants. In addition, some wearable items, such as rings, are not sold in broad size categories, such as small, medium, and large. Instead, these items require precise measurements from a user to fit properly.

When the size of an article is needed, a user typically has to guess the proper size to select, particularly if the user is unfamiliar with the brand of the purchased items. Because some speculation is involved, it can be difficult for a user to select the proper size on the first try. Unfortunately, this mistake often is not revealed until a user attempts to wear an article of clothing. If the user guessed incorrectly, as is often the case, the user must make a new selection based on how the "wrong" selection fit.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to selecting sizes of wearable articles. In particular, in various embodiments images are captured of articles of clothing, body parts associated with certain articles of clothing, or tracings of those body parts. Such images can include reference items to find the appropriate size of additional articles of clothing. Various other applications, processes, and uses are presented below with respect to various embodiments.

Figure 1:
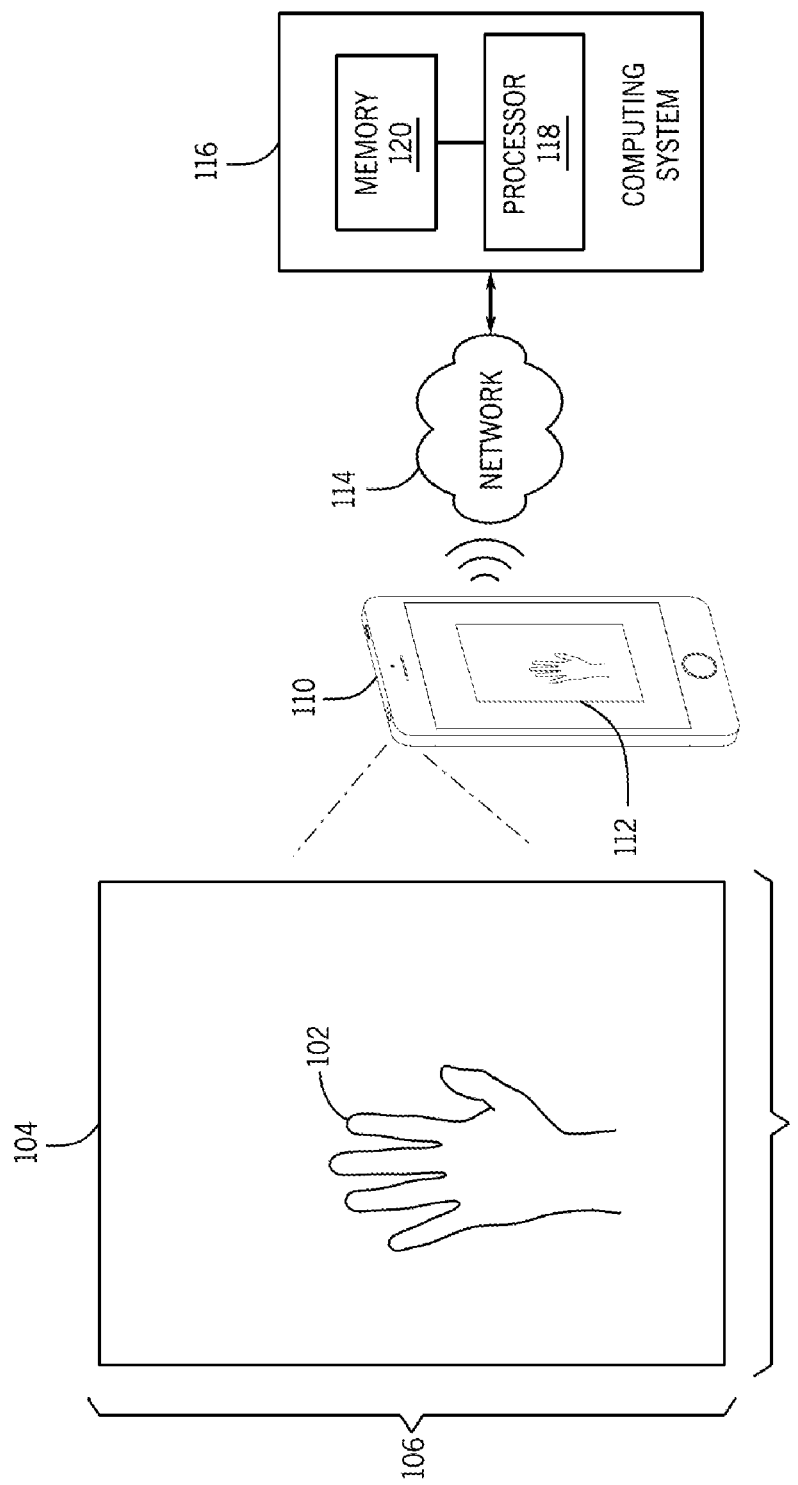
FIG. 1 illustrates an example hand tracing approach in an example environment in which aspects of the various embodiments can be practiced.

FIG. 1 illustrates an example tracing approach in an example network configuration in which various embodiments can be practiced. In this example network configuration, a computing system 116 is operable to execute various programs, applications, and/or services, and further operable to enable accurate size selection according to various embodiments of this disclosure. Such a computing system 116 may include one or more processors 118 and computer memory 120 with embedded instructions. The computing system 116, when the instructions are executed, can perform operations in accordance with various embodiments discussed in this disclosure.

In the example of FIG. 1, a mobile device 110 captures image data, such as an image 112. The term "image" will be used herein for consistency, and should be construed to include image data, images, etc. The mobile device 110 relays the captured image 112 to a computing system 116 over a network 114 such as the Internet. The mobile device 110 can be any device suitable to capture images, including, for example, a smartphone, tablet, laptop, or camera. In addition, although in some embodiments the computing system 116 is illustrated as remote from the mobile device 110, it will be understood that the mobile device 110 also includes one or more processors and memory. Therefore, various operations discussed in this disclosure may be executed by the computing system of the mobile device, a computing system 116 in communication with the mobile device 110 over a network 114, a computing system otherwise in communication with the mobile device 110, or some combination of these computing systems.

In various embodiments, a user of an online retailer can be prompted, after selecting an article of clothing, to provide an outline of a body part in order to select the article of clothing in a size appropriate for the user. In some cases, the user may provide the outline before selecting a specific article of clothing to view multiple articles in the user's size. The outline can be provided by having the user trace the body part associated with the article of clothing in which the user is interested. For example, the user can be prompted to trace an extremity, such as a hand or foot, in order to provide accurate size selection for gloves or footwear respectively. In the example of FIG. 1, the outline comprises a hand tracing 102 on a sheet of paper 104 having a sheet length 106 and sheet width 108.

In various embodiments, an extremity may be traced directly on a mobile device. For example, a user may trace her hand on a tablet or similar device according to various embodiments. If a user is interested only in rings, for instance, the user may trace her finger on a smartphone or similar device according to various embodiments. That is, in various embodiments image data may be captured from a tracing, otherwise referred to as traced marking, or other representation submitted from a mobile device according to the mobile device's touch input or other input. Image data does not necessarily have to come from use of a camera in various embodiments.

Figure 2:
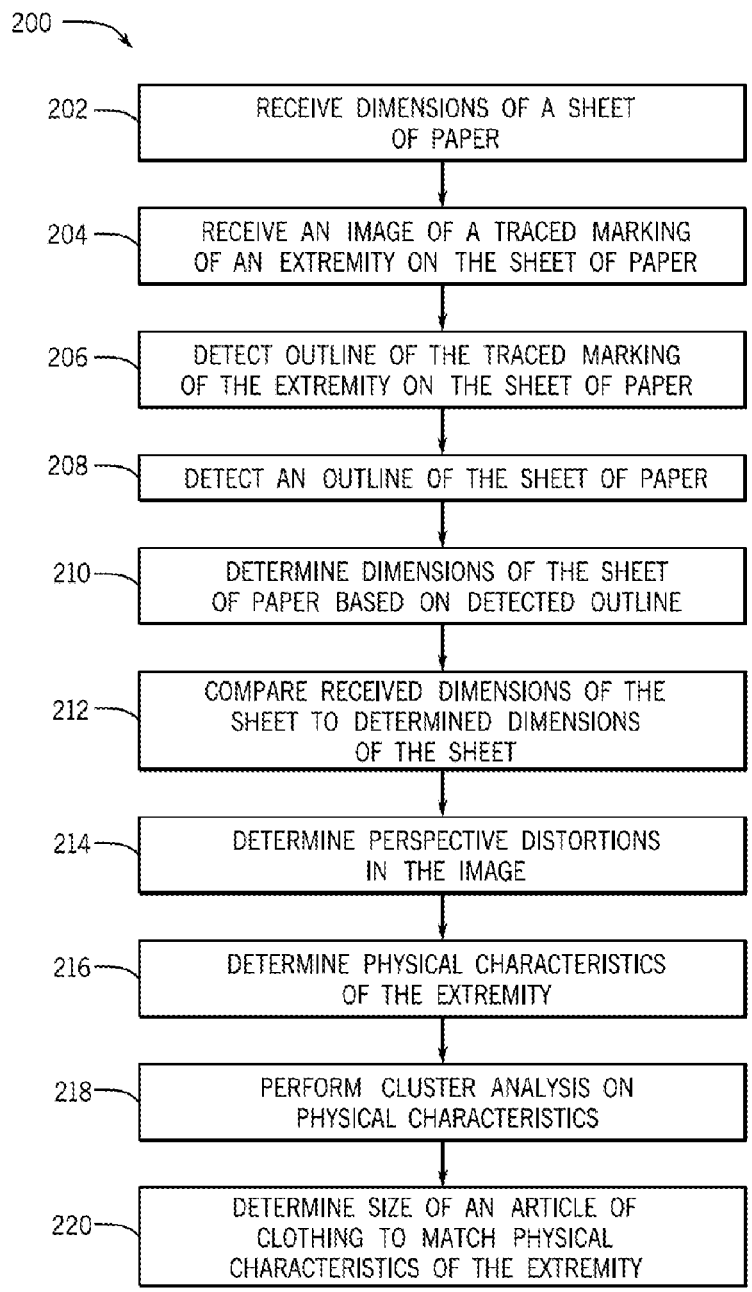
FIG. 2 illustrates an example process that can be utilized in accordance with various embodiments.

FIG. 2 illustrates an example tracing process 200 that can be utilized in various embodiments in which the sheet length 106 and the sheet width 108 are known. It should be understood that reference numbers may be carried over between figures for similar components for purposes of explanation, but that such use should not be interpreted as a limitation on the various embodiments. It also should be understood that, for any process discussed herein, there can be additional, fewer, or alternative steps performed in similar or alternative orders, or in parallel, within the scope of the various embodiments unless otherwise stated. In various embodiments, either before or after capturing an image, a user may be prompted to select a paper of standard size, such as a size from the A, B, or C international standard series. Sizes common to the user's geographic region may be featured, such as the 8½ by 11 inch sheets common in the United States, to ease the selection process.

In some cases, the user may be asked to manually enter the dimensions of a sheet of paper. In various embodiments, the user interface of the mobile device 110 can facilitate the process of receiving dimensions of the sheet of paper. For instance, an on-screen ruler can be used to facilitate entry of dimensions. If, for example, a large tablet is used as the mobile device, the paper with the tracing can be placed on the tablet. It can then be traced itself, or its presence can be detected, in order to provide precise dimensions of the sheet of paper. After the dimensions are specified, a computing system may receive dimensions of the sheet of paper 202.

As noted, the user may be prompted to trace an extremity on the sheet of paper. The trace may provide a partial or substantially complete outline of the extremity. For example, a user interested in gloves may be prompted to provide a nearly complete (e.g., closed) tracing of her hand to the extent possible. A user interested in watches or bracelets may be prompted to provide a traced marking of the wrist region so as to estimate the size of the user's wrist. Likewise, a user interested in rings may be prompted to provide a traced marking of her fingers. According to various embodiments, a more complete outline may result in more wearable items capable of being sized from a single tracing; however, some users may have particular areas of interest and may wish to trace just these areas, for example to expedite the sizing process. Once a tracing is prepared, the user may capture an image of an outline, which can be relayed to a computing system such as that shown in the example configuration of FIG. 1. The computing system receives an image of a traced marking of the extremity on the sheet of paper 204.

Embodiments may further include detecting the outline of the traced marking of the extremity on the sheet of paper 206. A number of techniques can be used to detect the outline. In various embodiments, active contouring techniques are used to detect the precise shape of the outline. Active contouring techniques include the generation of multi-point lines. The points on each line can seek boundaries within a captured image, such that each multi-point line "hugs," or conforms to, an outline in the captured image.

In various embodiments, segmentation techniques are used to detect the outline of the traced marking and, in embodiments, to detect internal shape moments. An outline can be detected, for example, by partitioning an image into sets of pixels sharing similar characteristics. Differences in intensity, contrast, and other properties can be used as indicators of a boundary within an image. Thus, segmentation provides another technique that can be used in place of or in combination with other techniques to detect outlines in an image.

Embodiments further include detecting an outline of the sheet of paper 208. A number of techniques can be used to detect the outline of the sheet of paper as well. These include those used to detect the outline of the traced marking of the extremity. In addition, however, embodiments can take advantage of the fact that the sheet of paper has a relatively simple, rectangular shape. Thus, line integrals can be used to quickly detect the boundaries of a sheet of paper, among other techniques. Dimensions of the sheet of paper can be determined based on the detected outline 210. It should be understood when an operation is stated as "based on" another operation, output, or factor, "based on" does not mean "wholly dependent on to the exclusion of all other influences." Rather, "based on" should be considered to mean "based at least in part on." These determined dimensions are at times herein referred to as perceived dimensions because these dimensions refer to the dimensions perceived based on the detected outline. Further, the received dimensions of the sheet of paper and the determined dimensions of the sheet of paper can be compared 212. One or more perspective distortions in the image can be determined based on this comparison 214.

Figure 3:
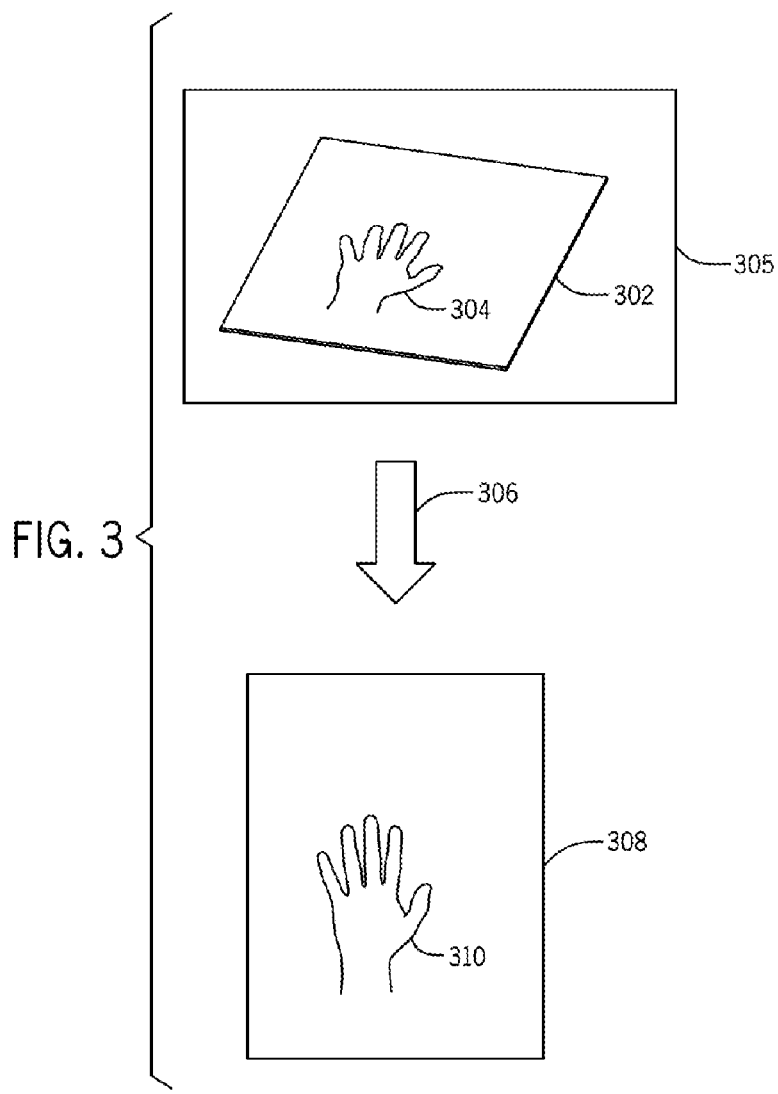
FIG. 3 illustrates an example approach for dewarping a received image that can be utilized in accordance with various embodiments.

Perspective distortions can arise for a number of reasons. Turning briefly to FIG. 3, a common perspective distortion is illustrated. For example, in some cases an image may be captured with a mobile device that is off-center, rotated, or tilted. As a result, the sheet of paper 302 in the image 305 can appear not as a rectangle, but as a general quadrilateral or otherwise warped. It follows that the outline 304 on the warped sheet 302 may appear warped as well. By comparing the actual dimensions of the sheet of paper to the observed dimensions, these distortions can be determined 212. After the image is modified using known and observed data points of the sheet of paper, both the sheet of paper 308 and outline 310 can be dewarped and, moreover, properly scaled.

Returning to FIG. 2, determining perspective distortions in the captured image 214 enables determination of physical characteristics of the extremity 216. That is, the transformations applied to the sheet of paper in the image can be applied to the outline of the extremity in the image to determine physical characteristics of the extremity. Transformations can include, for example, dilations, contractions, rotations, and translations. Transformations can be applied to the outline based on observed data. As an example, user error can contribute to distortions in the tracing, at times in predictable ways. For instance, although a tracing should closely approximate the size and shape of a user's actual extremity, the marker or writing utensil used to make the tracing may not be held directly against the user's extremity, which may lead to varying degrees of inflation. The fidelity of the tracing is one indicator of such inflation. That is, a tracing performed by holding a marker very close to the extremity may appear coarse or jagged because such closeness naturally leads to the marker's bumping against the extremity. On the other hand, a very smooth tracing indicates some separation between the extremity and the marker. Other indicators can provide additional data for determining physical characteristics of the extremity.

Physical characteristics can include length and width as well as other characteristics that affect the fit of a wearable item. For example, physical characteristics can include the length and width of individual digits and shape moments of the extremity. After determining physical characteristics of the outlined extremity 216, the size of an article of clothing that matches the physical characteristics of the extremity can be determined 220. Matching, as used herein, refers to a determination that a certain article of clothing meets, within acceptable ranges, criteria relevant to the article's fit on a user. Put another way, a match between a size of an article and physical characteristics of an extremity indicates a correspondence between the size and the physical characteristics.

Optionally, a cluster analysis can be performed on the physical characteristic data 218. For example, an entity, such as an online retailer, may perform the operations discussed in this disclosure for multiple users. Over time, a user's submitted outline can be matched to other users' submitted outlines having similar size and shape properties. Feedback from these previous users can be used to determine the right size to recommend for the current user. For example, it may be determined that User C has the same foot size and shape as previous Users A and B. If User A reports back that a size 8 shoe in Brand X was a perfect fit, the online retailer can utilize this data, for example, to recommend that User C order a size 8 for Brand X. If User B reports back that a size 8 in Brand Y was too big, the online retailer can recommend that User C order a size 7½ in Brand Y.

The cluster analysis can further include additional data requested from or volunteered by the user. For example, the user's weight and height may be factored into the cluster analysis in certain embodiments. In various embodiments, a cluster analysis collects information about users and groups, or "clusters," users according to the collected information. It may be determined, for example, that users in the same height cluster often report that shorts from Brand A are too short, or users in the same weight cluster often report that shirts from Brand B are too loose. It may also be determined, for example, that users in the same geographic cluster often report that socks from Brand C are too thin, or that users in the same age cluster often report that ties from Brand D are too narrow. In short, clusters can be defined based on any data available and can relate to the size, function, fashion, or other characteristics of wearable items.

Performing a cluster analysis on the physical characteristics data 218 provides one path to determine the size of an article of clothing matching the physical characteristics of the outlined extremity 220. In various embodiments, the physical characteristics are mapped to sizes based on other available data, such as data provided by designers and manufacturers or publicly available data on sizing standards.

Figure 4:
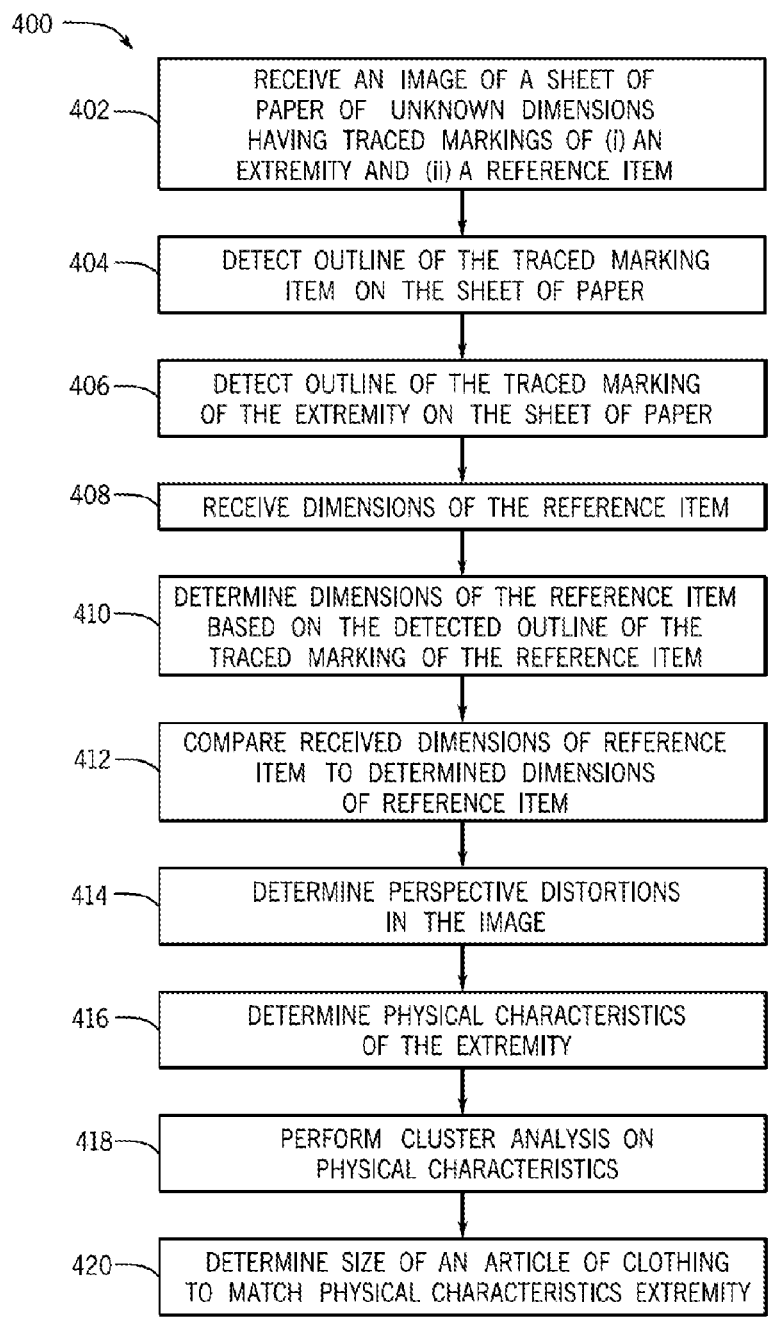
FIG. 4 illustrates an example process that can be utilized in accordance with various embodiments.

There are numerous variations to the sizing algorithms discussed in this disclosure, based on the information available, the desired outcome, and other factors. For example, it may be the case that the user does not know the dimensions of the sheet of paper on which an outline is provided. FIG. 4 illustrates an example method that can be utilized according to such embodiments. The example method will be discussed with reference to FIG. 5, which illustrates an example set-up in line with the example method of FIG. 4.

As noted, in some cases the user may have a sheet of paper 504, but the sheet length 506 and sheet width 508 may be unknown. In such an example, a user may capture, and a computing system may receive, an image of the sheet of paper of unknown dimensions with traced markings of (i) an extremity and (ii) a reference item 402. Because the dimensions of the sheet of paper 504 are unknown, a reference item of known dimensions can serve as a fiducial marker. Reference items can include dollar bills, coins, or other items of known dimensions. Such items can be identified in the image and their dimensions can be searched for and retrieved.

It will be understood that one or more reference items can be traced even if the extremity is outlined on a paper of known dimensions. Such an approach provides more data when the image is processed to account for perspective distortions. In the example embodiments discussed with respect to FIGS. 4 and 5, however, it is assumed that the sheet length 506 and sheet width 508 are unknown.

In some cases, the user may provide traced markings of both an extremity and a reference item. As discussed above, the user may choose to trace a common item, such as a dollar bill or coin. In various embodiments, the user can trace her mobile device 510. Thus, the mobile device outline 514 can appear on the same sheet of paper 504 as the extremity outline 507. Embodiments include detecting the outline of the traced marking of the reference item on the sheet of paper 404. The precise means of detecting the outline of the reference item can vary depending on the reference item used as well as other factors. For example, where a mobile device 510 is used as a reference item, the reference item outline 514 may appear substantially rectangular. In such a case, line integrals can be used to detect the reference item outline 514, though it will be understood that other means are available as well.

Once the outline of the traced marking of the reference item is detected 406, the dimensions of the reference item can be received 408. If the reference item is a mobile device 510, then the captured image can include metadata with the mobile device's dimensions or other metadata sufficient to at least identify the mobile device model. Once the mobile device model is identified, the precise specifications of the mobile device 510 can be retrieved by searching a library or database.

Figure 5:
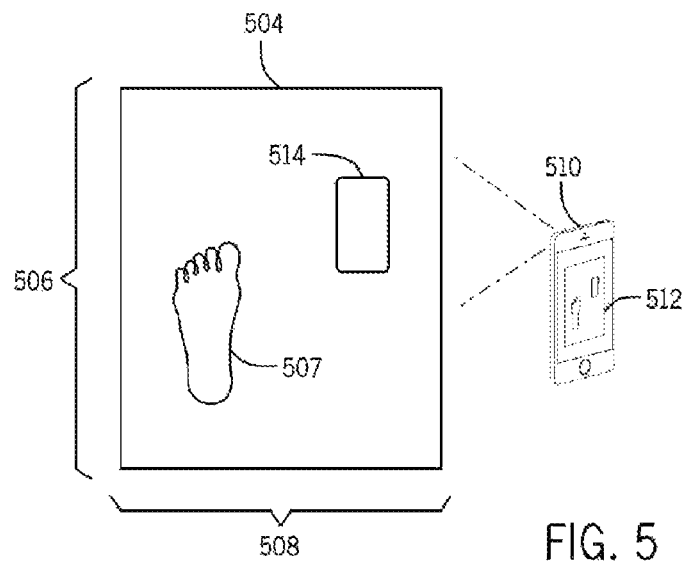
FIG. 5 illustrates an example tracing approach that can be utilized in accordance with various embodiments.

The dimensions of the reference item can be determined based on the detected outline of the traced marking of the reference item 410. Thus, the actual, received dimensions of the reference item can be compared to the determined dimensions of the reference item 412. When the reference item is the user's mobile device, as illustrated in FIG. 5, this means the actual dimensions of the mobile device 510, as retrieved from a specification library, are compared to perceived dimensions of the mobile device, as measured by detecting the outline of the mobile device traced marking 514.

This comparison allows for the determination of perspective distortions in the image 414. As discussed above with reference to FIG. 3, several factors can cause the sheet of paper in the image to appear distorted. Determining perspective distortions with respect to a reference item allows for the determination and correction of perspective distortions in the image generally, and consequently the determination and correction of perspective distortions in the outline of the extremity. As a result, physical characteristics of the extremity can be determined 416. As discussed more thoroughly above, an optional cluster analysis can be performed on the physical characteristics data 418. Whether the cluster analysis is performed 418 or not, the physical characteristics data can be used to determine a size of an article of clothing to match the physical characteristics of the traced extremity 420.

In several of the embodiments discussed so far, the outline of the extremity has been provided by having the user trace her extremity. In some embodiments, such as that shown in the example of FIG. 6, a tracing is not used. An outline can be detected from any representation of an extremity. There are many ways to represent the extremity. For example, the extremity may be represented by the extremity itself. Likewise, a representation of a reference item may include the reference item itself. In various embodiments, a representation can be provided from a traced marking, an ink imprint, a compression imprint, or in other manners. For instance, a user can place an extremity 602 directly on a sheet of paper 604. The sheet of paper 604 can be of known dimensions, in which case perspective distortions can be determined as discussed above with respect to FIGS. 1 and 2, or the sheet of paper 604 can be of unknown dimensions, in which case perspective distortions can be determined as discussed above with respect to FIGS. 4 and 5. Thus, an outline can be detected not from a tracing of the extremity, but from the extremity itself by applying various methods described above, including segmentation and active contouring.

Figure 6:
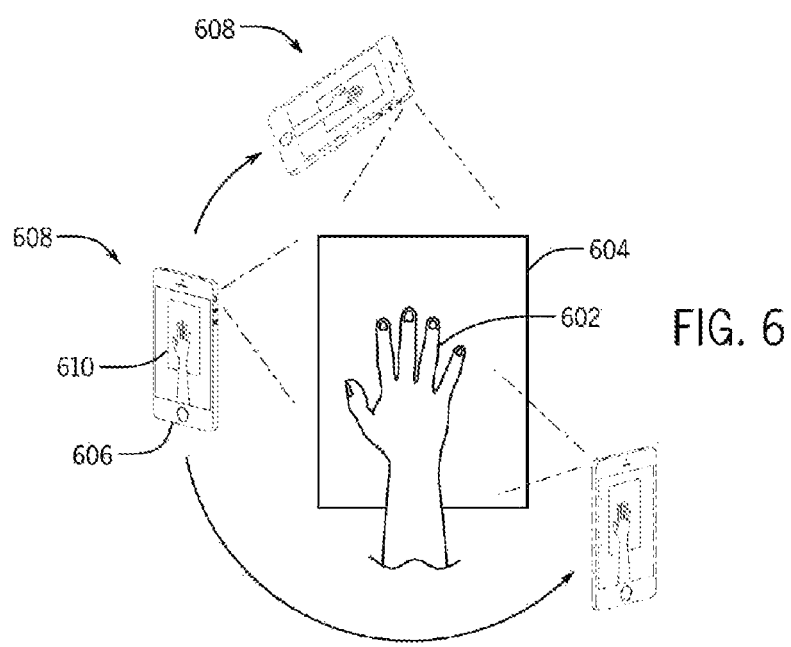
FIG. 6 illustrates an example video-based approach that can be utilized in accordance with various embodiments.

FIG. 6 illustrates another aspect of various embodiments. In certain cases, the mobile device 606 can be used to capture a video 610 or a series of images rather than a single image. In various embodiments, the mobile device is panned 608 around the sheet of paper 604 and extremity 602, together or separately, in order to provide multiple perspectives of each. Capturing a video 610 can be useful for a number of reasons. For example, a video inherently includes a plurality of images, and each image can be separately analyzed using techniques discussed in this disclosure. Thus, where this disclosure discusses processing of an image, it will be understood that the associated steps can be repeated for multiple images showing different perspectives of the same scene so as to provide more data for accurate size selection. In addition, the video can be analyzed using simultaneous localization and mapping (SLAM) techniques to detect and map a user's extremity. These techniques can be used in place of or in addition to other techniques discussed in this disclosure.

In embodiments, a video or a series of still images, can be used in background subtraction techniques. For example, if one image includes a sheet of paper, and another image includes a sheet of paper with the user's hand overlaying it, then a comparison of the two images can show the difference: the hand. Eliminating the background allows for more accurate determination of physical characteristics of the hand or other body part being analyzed.

Another feature of video capture in various embodiments is the concurrent capture of audio. An audio file can be captured along with the video file to provide additional data. In various embodiments, the audio file data can apply to the fit of the desired article of clothing. Thus, determining the size of an article of clothing for the user can further be based on information in the audio file. For example, while panning a mobile device around her foot to capture a video file, a user might say "I like my running shoes to have a snug fit." The sizing algorithm can process this input and provide running shoes slightly smaller than would otherwise be provided. In some cases, the audio file might apply strictly to a fashion preference. For instance, while panning a mobile device around her hand to capture a video file, a user might say "I am looking for red gloves." In that event, an online retailer might display gloves in the correct size and with the color preference indicated.

An audio file accompanying a video file is simply one way to provide additional data for sizing or fitting. For example, an audio file can be separately recorded and attached to, or otherwise sent with, a captured image. In various embodiments, information that might be recorded with an audio file can also be typed into a text file or caption that accompanies an image or video. A computing system with an online retailer can receive these files together or, in various embodiments, sequentially after prompting a user for additional information.

Figure 7:
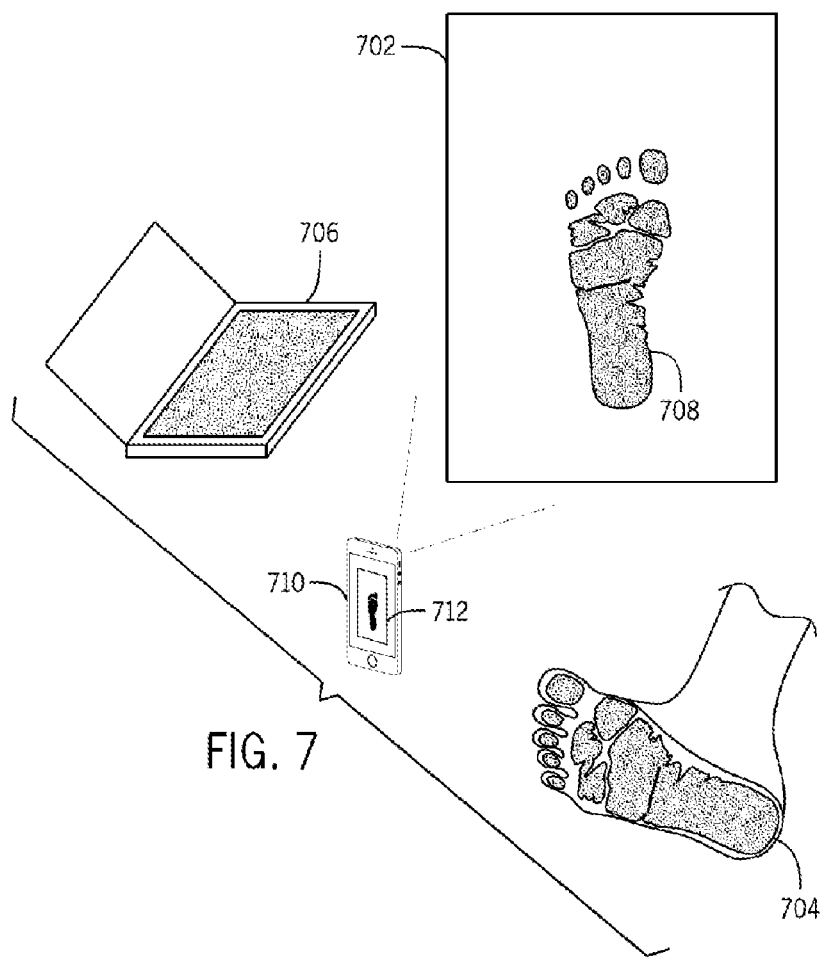
FIG. 7 illustrates an imprint-based approach that can be utilized in accordance with various embodiments.

FIG. 7 illustrates another non-tracing embodiment that can be utilized in accordance with various embodiments. In various embodiments, a user can place her hand or foot 704 on an ink pad 706 or otherwise cover her extremity in ink or another marking substance. The user can then make an ink imprint of her extremity 708 on a sheet of paper 702. The sheet of paper 702 can be of known or unknown dimensions and can include or not include an outline of a reference item. That is, the example embodiment illustrated in FIG. 7 can be utilized in combination with one or more other embodiments discussed in this disclosure. A mobile device 710 can be used to capture an image 712 of the sheet of paper 702 with an extremity ink imprint 708. Using one or more methods described in this disclosure, an outline of the extremity can be detected and perspective distortions in the image 712 can be determined. In the example illustrated, the appropriate size of shoes or other wearable items can be determined for the user's foot 704.

An ink imprint such as that illustrated in FIG. 7 can be useful for a number of reasons. For example, an ink imprint can show additional shape contours not readily visible in some cases. Moreover, an ink imprint can illustrate pressure points. An ink imprint of a foot, for instance, can be analyzed for pressure points that provide information on the arch and curvature of the foot. A user with a collapsed arch, for instance, may require different footwear than a user with a particularly high arch.

Figure 8A:
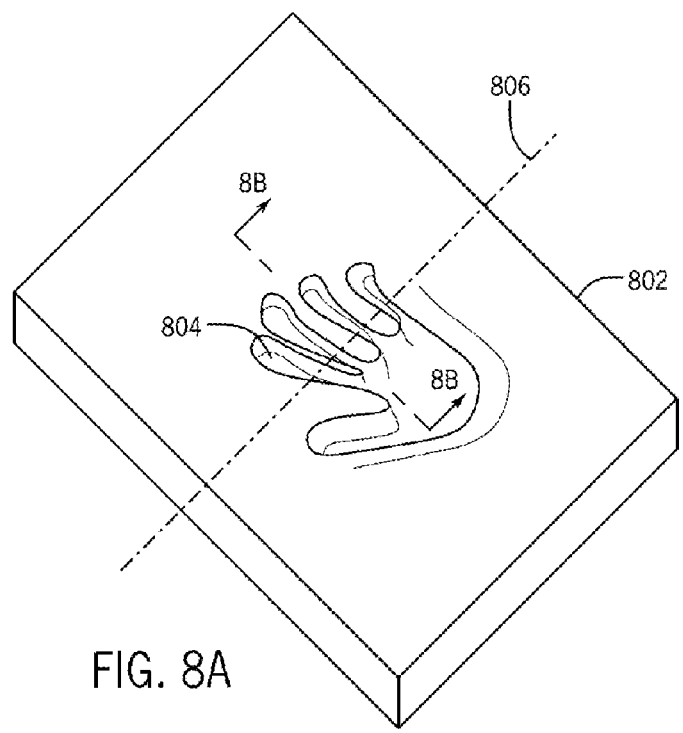
FIGS. 8A-B illustrate another imprint-based approach that can be utilized in accordance with various embodiments.
Figure 8B:
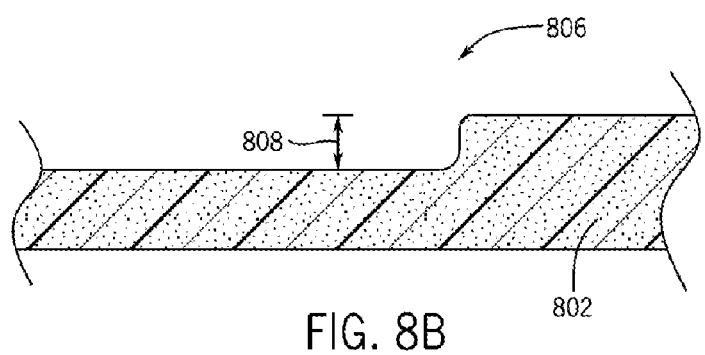

Pressure points can also be detected in other embodiments, including the example embodiment illustrated in FIGS. 8A-B. In embodiments, a compressible material 802 can be used to form a compression imprint 804 of an extremity. As seen at cross-section 806 in FIG. 8B, a compression imprint 804 can further reveal the depth 808 of individual digits. The depth and width of a finger, for example, can be used to provide more accurate size recommendations for rings. A compression imprint that includes a user's wrist, for example, can be used to provide more accurate size recommendations for watches and bracelets. Additional details can be provided if the user provides a compression imprint of the back of her hand as well. The two imprints can be integrated to construct a three-dimensional model of the hand. An imprint of the back of the hand, either alone or in combination with an imprint of the front of the hand, can be used to produce information relevant, for example, to the fitting of artificial nails. If the compression imprint is of a user's foot, details of the user's arch can be determined. As with other embodiments discussed in this disclosure, embodiments utilizing a compression imprint can be used in combination with one or more other disclosed embodiments.

For ease of discussion, sizing algorithms have been discussed with respect to an extremity, namely a hand or foot. Embodiments are not limited, however, to articles of clothing that can be worn on the user's hand or foot. Indeed, an article of clothing, as used in this disclosure, refers to any wearable item, including pants, shirts, coats, scarves, ties, jewelry, eyeglasses, and hats, to provide a few examples. For some of these items, it may be inconvenient for a user to trace the item on a sheet of paper. Therefore, in various embodiments, articles of clothing are analyzed directly to provide size recommendations for other articles of clothing of interest.

Figure 9:
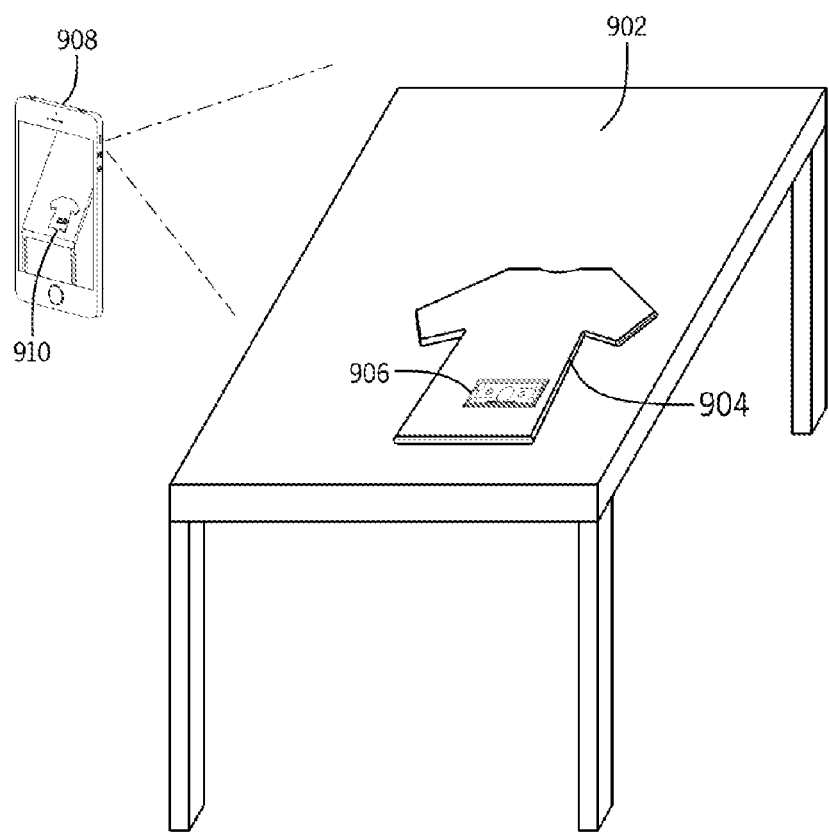
FIG. 9 illustrates an example fiducial-based sizing approach that can be utilized in accordance with various embodiments.

FIG. 9 illustrates an embodiment in which a shirt 904 is analyzed to provide size recommendations for other shirts.

The shirt 904 to be analyzed can be laid out on a flat surface, such as the table 902 depicted in FIG. 9. A reference item 906 can be placed on or near the shirt 904. In the example embodiment of FIG. 9, a dollar bill is used as the reference item 906. The reference item 906, however, can take many forms. So long as the dimensions of the reference item 906 are provided or can be retrieved, any object can serve this role. For example, the table 902 itself could serve as the reference item in appropriate circumstances. As with other embodiments, a mobile device 908 is used to capture an image 910 of the shirt 904 together with the reference item 906.

Figure 10:
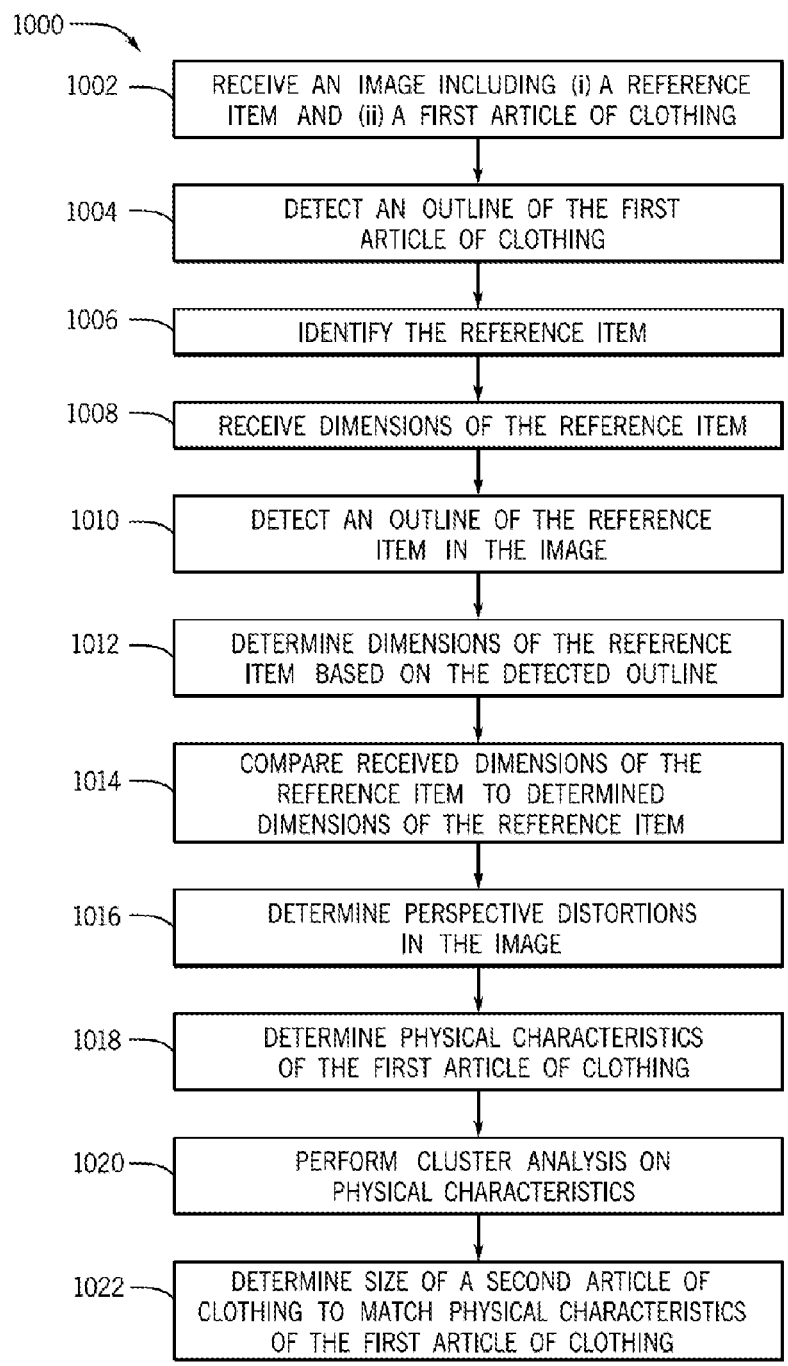
FIG. 10 illustrates an example method that can be utilized in accordance with various embodiments.

FIG. 10 illustrates an example method 1000 that can be practiced, for example, with the setup described with reference to FIG. 9. The example method can include, under the control of one or more computing systems, receiving an image including (i) a reference item and (ii) a first article of clothing 1002. The outline of the first article of clothing can be detected 1004 using, for example, one or more of the techniques described in this disclosure. For example, segmentation and active contouring techniques can be used to detect an outline of the shirt 904 in FIG. 9.

The example method further includes receiving dimensions of the reference item 1008. In some cases, the dimensions can be manually entered by a user. In other cases, the method can first include identifying the reference item 1006. Various techniques exist for recognizing objects in images. Thus, in the set-up of FIG. 9, processing the captured image 910 can reveal the presence of a dollar bill. The user can be prompted to confirm that the dollar bill is being used as a reference item. In some cases, for instance when an object is identified with a high degree of certainty, the reference item can be identified automatically. Thus, a confidence score can first be calculated for one or more objects in the image, and a reference item can be selected based on the confidence score. In various embodiments, a user may aid identification of the reference item, for example by typing, speaking, or otherwise indicating the reference item being used. Hence, there are numerous means for a computing system to identify the reference item 1006.

In certain embodiments in which the dimensions of the reference item are not manually provided, dimensions of the reference item can be received 1008 by performing a search for the reference item identified 1006. For example, if it is determined that the reference item being used is a dollar bill, a search can be performed for the dimensions of a dollar bill. This technique may include determining various characteristics of the reference item, including, for example, size, shape, and color, in order to identify the reference item.

In various embodiments, the outline of the reference item in the image can be detected 1010. This can be done, for example, using line integrals, segmentation and active contouring techniques, or other techniques based on the reference item used and other factors. Dimensions of the reference item can be determined based on the detected outline 1012. The received dimensions of the reference item can be compared to the determined dimensions of the reference item 1014. This comparison can be used to determine perspective distortions in the image 1016, as discussed in more detail with respect to other embodiments. The physical characteristics of the first article of clothing can be determined 1018 using one or more techniques discussed with reference to other embodiments. The physical characteristics can include length and width of the overall article of clothing and of individual segments that affect fit, such as sleeves of shirts or inseams of pants. The physical characteristics can further include shape moments that define the curvature of the first article of clothing.

As with other embodiments, an optional cluster analysis can be performed on the physical characteristics data 1020 so that feedback from previous users contributes to more accurate size recommendations. Then a size of a second article of clothing can be determined to match the physical characteristics of the first article of clothing 1022.

Again using the shirt 904 of FIG. 9 as an example, this means a user can take a picture of his favorite shirt 904 and receive a size recommendation for a different shirt. Given that the second shirt may be associated with a different brand, a user may not be able to simply select the second shirt in the same size as his favorite shirt. But, using methods described in this disclosure, the user can select a second shirt in a size matching the physical characteristics of his favorite shirt. Thus, if he has a shirt with a particularly comfortable fit, he can find shirts of the same fit, even if the other shirts are associated with unfamiliar brands.

Figure 11:
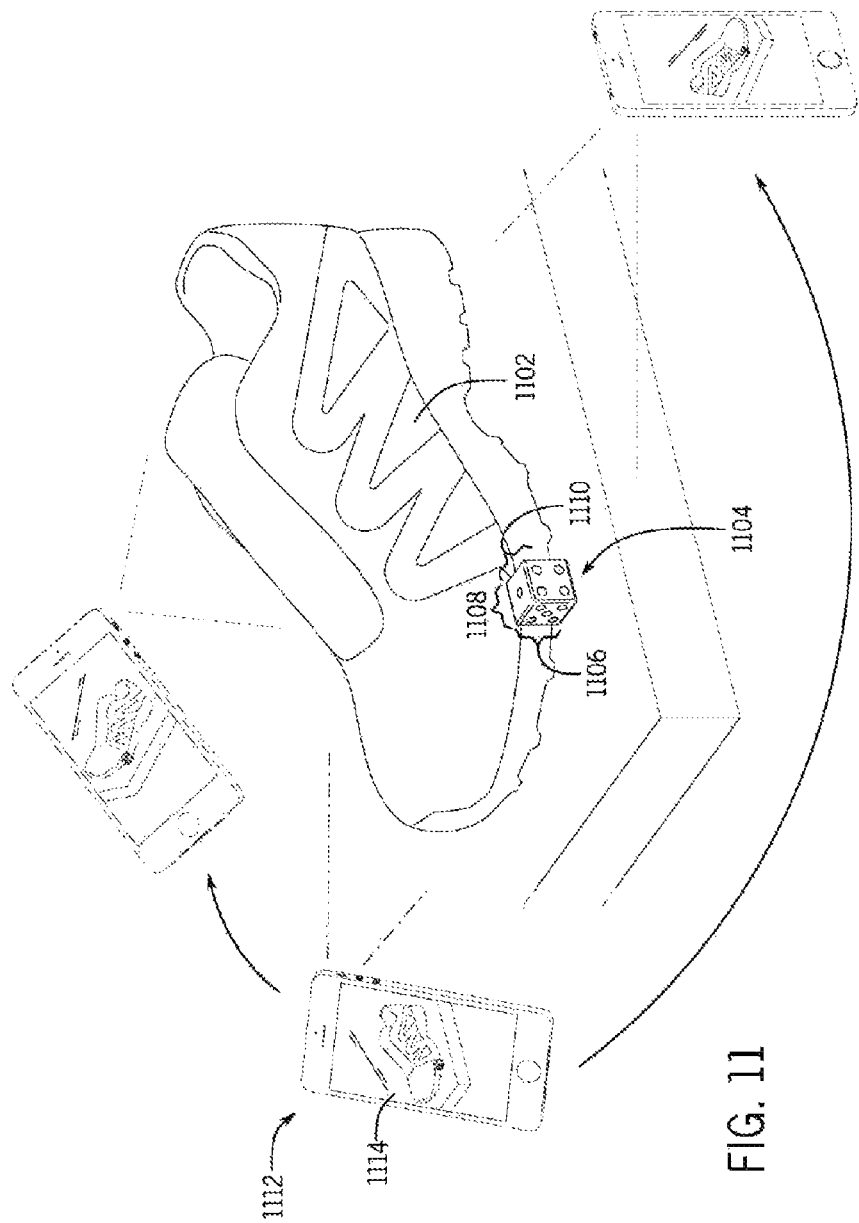
FIG. 11 illustrates an example three-dimensional fiducial-based sizing approach that can be utilized in accordance with various embodiments.

Analogous techniques can be implemented in three dimensions. For example, as illustrated in FIG. 11, accurate size selection for shoes can be provided using a three-dimensional reference item. Processing an image of a three-dimensional reference item with an article of clothing can be used in place of or in combination with one or more other embodiments described in this disclosure. For example, an article of clothing 1102, such as the shoe of FIG. 11, can be placed on a table next to a three-dimensional reference item 1104, such as a die, a measuring cup, or numerous other items. Thus, while FIG. 11 is discussed with reference to a die, it will be understood that other items can be used.

As with the dollar bill example discussed, the three-dimensional reference item 1104 can be identified automatically or indicated by a user. If it is automatically determined or otherwise indicated that the three-dimensional reference item 1104 is a standard sized item, then the reference item's width 1108, length 1110, and height 1106 can be determined. In some cases, such as the case of a die, the reference item's width, length, and height may be all the same. Regardless of the specific item used, however, the actual dimensions can be received from the user's manual input, by searching for the relevant standards, or through other means. Likewise, it may be determined that width, length, and height are not the most convenient dimensions to use for the three-dimensional reference item 1104. For example, if a tennis ball is used as the three-dimensional reference item 1104, it may be sufficient to receive the radius of the tennis ball.

A mobile device 1112 can be used to capture an image 1114 of the article of clothing 1102 together with the three-dimensional reference item 1104. In various embodiments, the mobile device 1112 can include three-dimensional sensors in order to provide additional depth data in the captured image 1114 or a captured video. In various embodiments, depth data is provided by utilizing a mobile device 1112 with more than one camera. The use of two or more cameras provides additional depth data that can be used to more accurately determine the physical characteristics of the article of clothing 1102 in the captured image 1114. In various embodiments, a mobile device 1112 is panned around the three-dimensional reference item 1104 and the article of clothing 1102 in order to capture a video or a series of stills to provide additional data. The video or series of stills can be used, for example, in conjunction with SLAM-based or background subtraction techniques.

In embodiments, a user may continue to wear an article of clothing while some of the techniques discussed herein are practiced. For example, a user may wear her favorite jeans and shirt in front of a mirror and capture an image or a video of herself along with a reference item. She may further annotate or provide audio commentary to submit additional data relevant to the fit of her favorite items.

Figure 12:
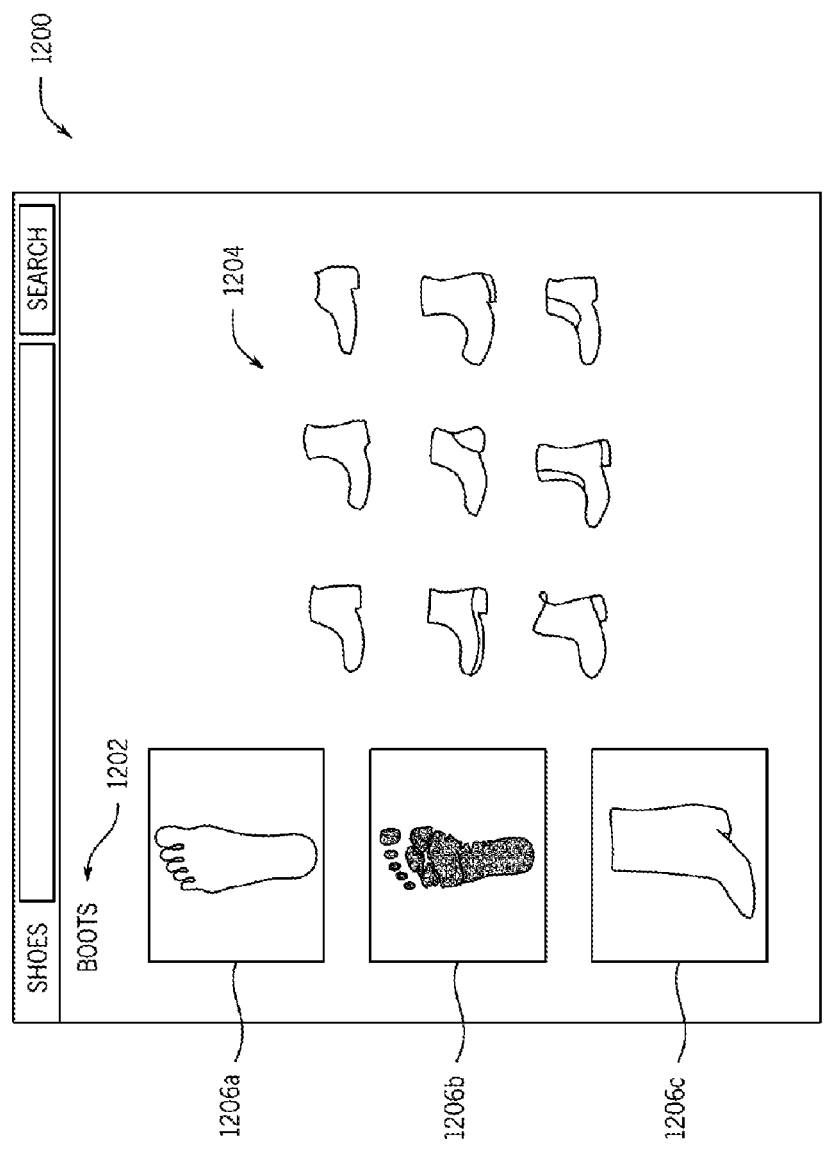
FIG. 12 illustrates an example user interface that can be utilized in accordance with various embodiments.

FIG. 12 illustrates an exemplary user interface 1200 that can be utilized in various embodiments. The user interface 1200 can be associated with an online retailer. A user may upload various captured images 1206a-c in line with various embodiments. The captured images 1206a-c may be displayed to a user as shown in FIG. 12, or they may be hidden from view. In various embodiments, the user may select a category 1202 for articles of clothing, such as boots. In various embodiments, the user uploads an image of a tracing of her foot 1206a. According to embodiments discussed in this disclosure, a computing system associated with the online retailer may receive the captured image 1206a and present the user with a numerous articles of clothing 1204 available in the user's determined size.

The user interface 1200 is compatible with other embodiments as well. For example, where the user captures an image of an ink imprint 1206b, embodiments described in this disclosure include determining pressure points of the imprinted extremity. In the case of a foot, this includes determining a user's arch, which, in turn, can be used to present numerous articles of clothing 1204 in the user's size and having the proper arch. In other embodiments, a user may directly capture an image of an article of clothing 1206c, for example as described in reference to FIGS. 9-11. Thus, the category 1202 may be automatically detected and other articles of clothing in that category and in the correct size may be presented to the user. Still in other embodiments, the user may select a category 1202, select a specific article of clothing of the numerous articles of clothing presented 1204, and then initiate the sizing process in accordance with one or more embodiments discussed in this disclosure.

Figure 13:
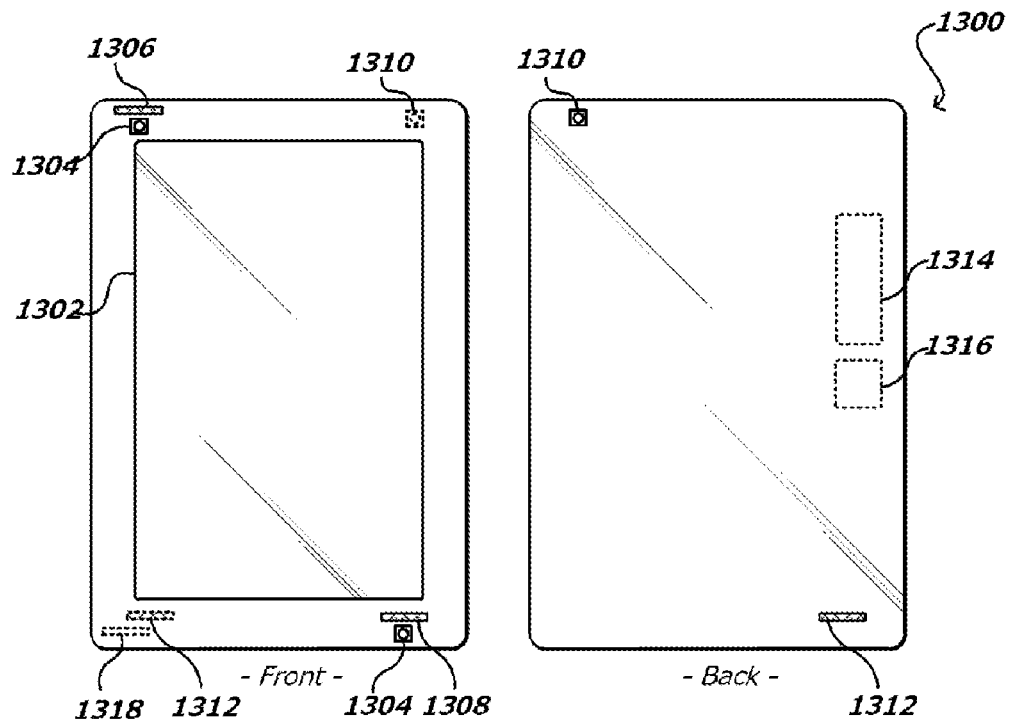
FIG. 13 illustrates aspects of an example electronic user device that can be utilized in accordance with various embodiments.

FIG. 13 illustrates front and back views of an example electronic computing device 1300 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1300 has a display screen 1302 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1304 on the front of the device and at least one image capture element 1310 on the back of the device. It should be understood, however, that image capture elements could also, or alternatively, be placed on the sides or corners of the device, and that there can be any appropriate number of capture elements of similar or different types. Each image capture element 1304 and 1310 may be, for example, a camera, a charge-coupled device (CCD), a motion detection sensor or an infrared sensor, or other image capturing technology.

As discussed, the device can use the images (e.g., still or video) captured from the imaging elements 1304 and 1310 to generate a three-dimensional simulation of the surrounding environment (e.g., a virtual reality of the surrounding environment for display on the display element of the device). Further, the device can utilize outputs from at least one of the image capture elements 1304 and 1310 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

As discussed above, the computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1308 on the front side, one microphone 1312 on the back, and one microphone 1306 on or near a top or side of the device. In some devices there may be only one microphone, while in other devices there might be at least one microphone on each side and/or corner of the device, or in other appropriate locations.

The device 1300 in this example also includes one or more orientation- or position-determining elements 1318 operable to provide information such as a position, direction, motion, or orientation of the device. These elements can include, for example, accelerometers, inertial sensors, electronic gyroscopes, and electronic compasses.

The example device also includes at least one communication mechanism 1314, such as may include at least one wired or wireless component operable to communicate with one or more electronic devices. The device also includes a power system 1316, such as may include a battery operable to be recharged through conventional plug-in approaches, or through other approaches such as capacitive charging through proximity with a power mat or other such device. Various other elements and/or combinations are possible as well within the scope of various embodiments.

Figure 14:
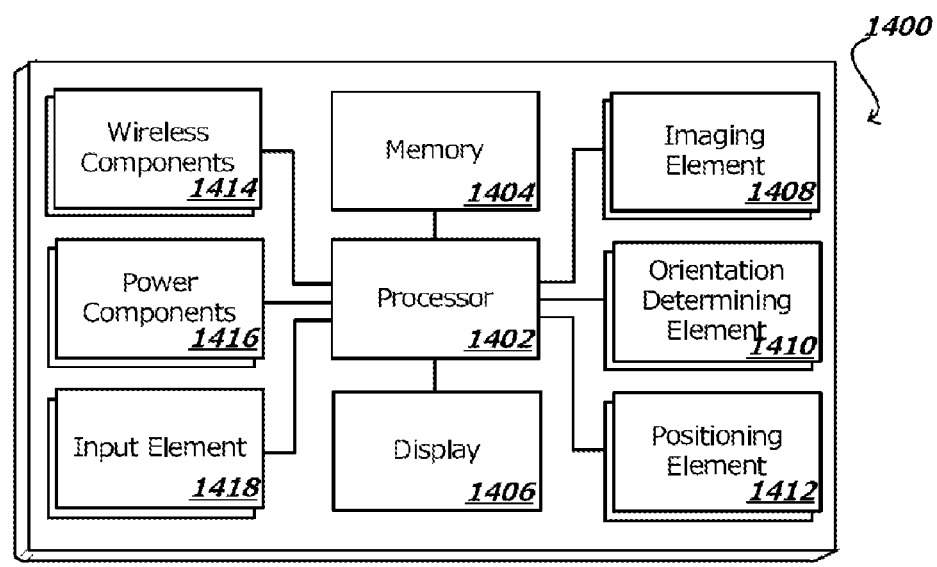
FIG. 14 illustrates aspects of an example computing system that can be utilized in accordance with various embodiments.

FIG. 14 illustrates a set of basic components of an electronic computing device 1400 such as the device 1300 described with respect to FIG. 13 or the computing system 116 discussed with respect to FIG. 1. In this example, the device includes at least one processing unit 1402 for executing instructions that can be stored in a memory device or element 1404. As would be apparent to one of ordinary skill in the art, the device can include many types of memory, data storage, or computer-readable media, such as a first data storage for program instructions for execution by the processing unit(s) 1402, the same or separate storage can be used for images or data, a removable memory can be available for sharing information with other devices, and any number of communication approaches can be available for sharing with other devices.

The device typically will include some type of display element 1406, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1408, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1400 also includes at least one orientation determining element 1410 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1400. An orientation determining element can also include an electronic or digital compass, which can indicate a direction (e.g., north or south) in which the device is determined to be pointing (e.g., with respect to a primary axis or other such aspect).

As discussed, the device in many embodiments may include at least a positioning element 1412 for determining a location of the device (or the user of the device). Thus, in embodiments, it may be determined that the user of the device is in a cold climate, and search results may take this into account by ranking, for example, snow boots over rain boots, or otherwise factoring in the user's location. A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1414 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1416, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1418 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 15:
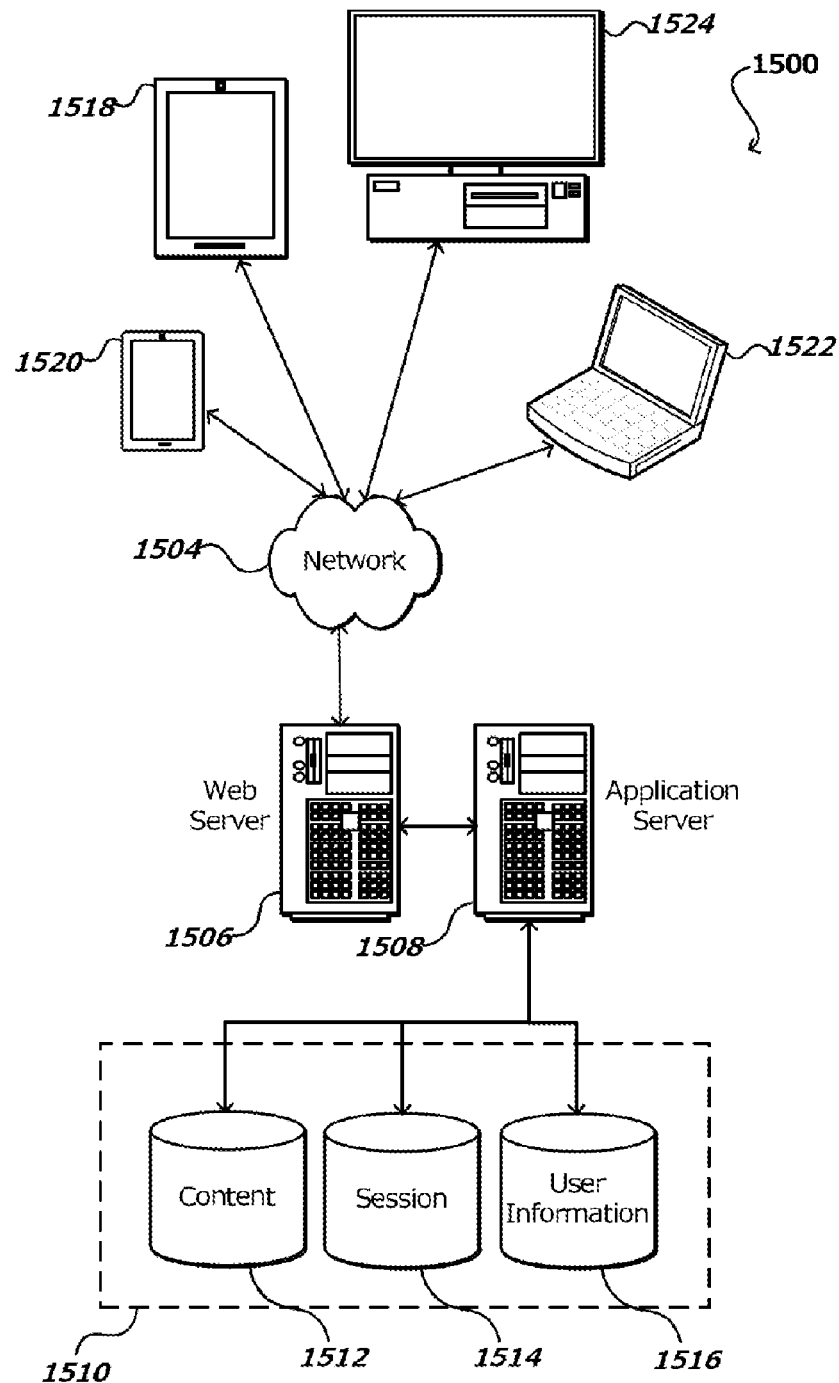
FIG. 15 illustrates an example environment in which aspects of the various embodiments can be practiced.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes electronic client devices 1518, 1520, 1522, and 1524, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like.

In some examples, multiple devices may be used in conjunction with one another. For example, a user may browse the inventory of an online retailer on her laptop. She may then select a shirt she wants to purchase. In embodiments, she may be prompted to find her size. Thus, she may use a smartphone in accordance with various embodiments. For example, the user may have an account with the online retailer, and she may be logged in to her account on both her laptop and smartphone. When she accesses the online retailer from her smartphone, for instance by webpage or mobile application, she may be greeted with a prompt to find the right size of the shirt she selected on her laptop. According to various embodiments, she can capture an image on her smartphone, which may be received by the online retailer directly, via her laptop, or through other means.

The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. For example, a data store as described can include a database to search for identified reference items according to various embodiments. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client devices 1518, 1520, 1522, and 1524 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1518, 1520, 1522 and 1524. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present techniques, such as those set forth in the claims.

What is claimed is:

1. A computer-implemented method for size selection, comprising:
  under the control of one or more computer systems configured with executable instructions,
  receiving dimensions of a sheet of paper, the dimensions comprising a sheet length and a sheet width;
  receiving video data including an image of a traced marking of at least a portion of an extremity on the sheet of paper, the extremity comprising a hand or a foot, and the video data including audio data;
  detecting an outline of the sheet of paper in the image;
  determining dimensions of the sheet of paper based on the detected outline of the sheet of paper;
  comparing the received dimensions of the sheet of paper to the determined dimensions of the sheet of paper;
  determining at least one perspective distortion in the image based on a comparison of the received dimensions of the sheet of paper to the determined dimensions of the sheet of paper;
  generating a modified image by modifying the image based on the determined at least one perspective distortion;
  detecting an outline of the traced marking of the extremity in the modified image;
  determining physical characteristics of the extremity based on the detected outline of the traced marking of the extremity, the physical characteristics including extremity size information and extremity shape information;
  matching the physical characteristics of the extremity with a plurality of physical characteristics of extremities of one or more other users determined using respective received images of traced markings, the plurality of physical characteristics being associated with respective fit recommendations of the one or more other users;
  analyzing the audio data to determine at least one preference; and
  determining a size of an article of clothing based at least in part upon the fit recommendations and the at least one preference.

2. The computer-implemented method of claim 1, further comprising:
  determining a smoothness of the traced marking; and
  determining an amount by which the detected outline of the traced marking of the extremity exceeds an actual size of the extremity based on the smoothness of the traced marking.

3. The computer-implemented method of claim 1, wherein determining physical characteristics of the extremity based on the detected outline of the traced marking of the extremity further comprises:
  determining actual dimensions of the sheet of paper based on the received dimensions of the sheet of paper;
  determining a mapping of the determined dimensions of the sheet of paper to the actual dimensions of the sheet of paper, the determined dimensions of the sheet of paper based on the detected outline of the sheet of paper, the mapping based on at least one transformation;
  applying the at least one transformation to the detected outline of the extremity; and
  determining physical characteristics of the extremity based on the at least one transformation applied to the detected outline of the extremity.

4. The computer-implemented method of claim 1, wherein detecting the outline of the traced marking of the extremity includes generating at least one curve comprising a plurality of points, the plurality of points capable of being correlated to boundaries in the modified image, wherein the correlation is utilized to conform the at least one curve to the outline of the traced marking.

5. A system for size selection, comprising:
  at least one processor;
  memory including instructions that, when executed by the at least one processor, cause the system to:
  receive dimensions of a reference item;
  receive video data including an image, the image including a representation of an extremity and a representation of the reference item, and the video data including audio data;
  detect an outline of the representation of the reference item in the image;
  determine a perspective distortion in the image based on a comparison the outline of the representation of the reference item and the received dimensions of the reference item;
  generate a modified image by modifying the image based on the determined perspective distortion;
  detect an outline of the representation of the extremity in the modified image;
  determine physical characteristics of the extremity based on the detected outline of the representation of the extremity;
  match the physical characteristics of the extremity with respective physical characteristics of extremities of one or more users based on previously-received images of traced markings of the respective extremities of the one or more users, the one or more physical characteristics of extremities of the one or more users being associated with respective fit recommendations of the one or more users;
  analyze the audio data to determine at least one preference; and
  determine a size of the article of clothing based at least in part upon the fit recommendations and the at least one preference.

6. The system of claim 5, wherein the reference item comprises a mobile device, the representation of the reference item comprises a traced marking of the mobile device, and the representation of the extremity comprises a traced marking of the extremity.

7. The system of claim 5, wherein the reference item and the representation of the reference item comprise a rectangular sheet of paper, and receiving dimensions of the reference item comprises receiving a sheet length and a sheet width.

8. The system of claim 7, wherein the representation of the extremity comprises a traced marking of the extremity.

9. The system of claim 7, wherein detecting the outline of the representation of the extremity comprises:
  partitioning the modified image into sets of pixels having shared characteristics; and
  determining that at least one set of pixels represents an edge of the representation of the extremity based on the partitioning.

10. The system of claim 5, wherein the representation of the extremity comprises an imprint of the extremity, the imprint comprising an ink imprint or a compression imprint, further comprising:
    determining at least one pressure point of the extremity based on the imprint of the extremity.

11. The system of claim 5, wherein to determine physical characteristics of the extremity based on the at least one determined perspective distortion in the image and the detected outline of the representation of the extremity further comprises:
    determining actual dimensions of the reference item based on the received dimensions of the reference item;
    determining a mapping of the determined dimensions of the reference item to the actual dimensions of the reference item, the determined dimensions of the reference item based on the detected outline of the representation of the reference item, the mapping based on at least one transformation;
    applying the at least one transformation to the detected outline of the representation of the extremity; and
    determining physical characteristics of the extremity based on the at least one transformation applied to the detected outline of the representation of the extremity.

12. The system of claim 5, wherein the memory further includes instructions that, when executed by the at least one processor, cause the system to:
    determine a size of an article of clothing, the size of the article of clothing substantially matching the physical characteristics of the extremity.

13. A computer-implemented method for size selection, comprising:
    receiving dimensions of a reference item;
    receiving video data including an image, the image including a representation of an extremity and a representation of the reference item, and the video data including audio data;
    detecting an outline of the representation of the reference item in the image;
    determining perspective distortion in the image based on a comparison the outline of the representation of the reference item and the received dimensions of the reference item;
    generating a modified image by modifying the image based on the determined perspective distortion;
    detecting an outline of the representation of the extremity in the modified image;
    determining physical characteristics of the extremity based on the detected outline of the representation of the extremity;
    matching the physical characteristics of the extremity with respective physical characteristics of extremities of one or more users based on previously-received images of traced markings of the respective extremities of the one or more users, the one or more physical characteristics of extremities of the one or more users being associated with respective fit recommendations of the one or more users;
    analyzing the audio data to determine at least one preference; and
    determining a size of the article of clothing based at least in part upon the fit recommendation and the at least one preference.

14. The computer-implemented method of claim 13, wherein the reference item comprises a mobile device, the representation of the reference item comprises a traced marking of the mobile device, and the representation of the extremity comprises a traced marking of the extremity.

15. The computer-implemented method of claim 13, wherein the reference item and the representation of the reference item comprise a rectangular sheet of paper, and receiving dimensions of the reference item comprises receiving a sheet length and a sheet width.

16. The computer-implemented method of claim 13, wherein the representation of the extremity comprises an imprint of the extremity, the imprint comprising an ink imprint or a compression imprint, further comprising:
    determining at least one pressure point of the extremity based on the imprint of the extremity.

17. The computer-implemented method of claim 13, further comprising:
    determining a size of an article of clothing, the size of the article of clothing substantially matching the physical characteristics of the extremity.

* * * * *